US010076111B2

(12) United States Patent
Hays

(10) Patent No.: US 10,076,111 B2
(45) Date of Patent: Sep. 18, 2018

(54) GAME ALERT SYSTEM

(71) Applicant: Hogman-Outdoors, LLC, Cypress, TX (US)

(72) Inventor: DeWayne L. Hays, Cypress, TX (US)

(73) Assignee: Hogman-Outdoors, LLC, Cypress, TX (US)

( * ) Notice: Subject to any disclaimer, the term of this patent is extended or adjusted under 35 U.S.C. 154(b) by 0 days.

(21) Appl. No.: 15/366,532

(22) Filed: Dec. 1, 2016

(65) Prior Publication Data

US 2017/0079260 A1  Mar. 23, 2017

Related U.S. Application Data

(63) Continuation-in-part of application No. 15/181,097, filed on Jun. 13, 2016, now Pat. No. 9,560,845, which is a continuation of application No. 14/691,476, filed on Apr. 20, 2015, now Pat. No. 9,380,776.

(60) Provisional application No. 61/981,522, filed on Apr. 18, 2014.

(51) Int. Cl.
| | |
|---|---|
| *G08B 23/00* | (2006.01) |
| *A01M 31/00* | (2006.01) |
| *G08B 5/36* | (2006.01) |
| *F21V 33/00* | (2006.01) |
| *H04N 5/232* | (2006.01) |
| *F41G 1/38* | (2006.01) |
| *H04W 4/80* | (2018.01) |

(52) U.S. Cl.
CPC ......... *A01M 31/002* (2013.01); *F21V 33/008* (2013.01); *F41G 1/38* (2013.01); *G08B 5/36* (2013.01); *H04N 5/23238* (2013.01); *H04W 4/80* (2018.02)

(58) Field of Classification Search
CPC ...... A01M 31/002; F21V 33/008; F41G 1/38; G08B 5/36; H04N 5/23238; H04W 4/008
USPC ....................................................... 340/573.2
See application file for complete search history.

(56) References Cited

U.S. PATENT DOCUMENTS

| | | | | |
|---|---|---|---|---|
| 5,450,060 A | * | 9/1995 | Parkhurst ............... | G08B 13/19 340/286.11 |
| 7,308,196 B2 | * | 12/2007 | Schnell .................. | G03B 17/00 396/153 |

(Continued)

OTHER PUBLICATIONS

Game Alert and Approach Monitor Deer and Bear Hunting Equipment dated Oct. 7, 2015.

(Continued)

*Primary Examiner* — Zhen Y Wu
(74) *Attorney, Agent, or Firm* — Vinson & Elkins LLP

(57) ABSTRACT

A game alert system includes a device mountable on a game feeder that detects motion in a target area and automatically sends an electronic signal to a user, or a hunter, in a remote location to notify the hunter of movement in the area, without alerting or startling animals that triggered the device. The system may include one or more cameras (which may be 360 degree cameras) and/or one or more GPS systems for obtaining photographs and/or video and/or collecting geographic data. The system may further include multiple motion sensors and a hub which wirelessly communicate with one another and which may communicate wirelessly with a user device such as a smartphone, tablet, night vision equipment, or other device.

36 Claims, 11 Drawing Sheets

(56) References Cited

U.S. PATENT DOCUMENTS

| | | | |
|---|---|---|---|
| 8,860,577 B1* | 10/2014 | Chumas | A01M 31/004 248/127 |
| 9,057,587 B2* | 6/2015 | Roman | F41G 1/467 |
| 9,070,188 B2* | 6/2015 | Cuddeback | A01M 31/002 |
| 9,476,676 B1* | 10/2016 | Greenslade | F41G 1/32 |
| 9,549,544 B1* | 1/2017 | Millsap | A01M 31/002 |
| 2001/0044282 A1* | 11/2001 | Lanza | H04B 1/46 455/92 |
| 2003/0067385 A1* | 4/2003 | Shank | A63H 33/00 340/539.1 |
| 2003/0151670 A1* | 8/2003 | Calderwood | G08B 13/19602 348/207.99 |
| 2005/0237208 A1* | 10/2005 | Wojcik | A01M 31/002 340/573.2 |
| 2007/0205890 A1* | 9/2007 | Brown | G08B 1/08 340/539.23 |
| 2008/0078113 A1* | 4/2008 | Denny | A01M 31/06 43/2 |
| 2008/0218341 A1* | 9/2008 | Royer | G01S 13/56 340/567 |
| 2008/0247160 A1* | 10/2008 | Jiang | A47B 97/00 362/227 |
| 2009/0103898 A1* | 4/2009 | Morioka | G11B 27/034 386/248 |
| 2009/0322259 A1* | 12/2009 | Glass | A01M 31/00 315/360 |
| 2010/0327766 A1* | 12/2010 | Recker | H02J 7/025 315/291 |
| 2011/0225867 A1* | 9/2011 | Moore | F41G 1/35 42/114 |
| 2012/0313779 A1* | 12/2012 | Papaefstathiou | G05D 1/0038 340/540 |
| 2013/0113624 A1* | 5/2013 | Masciovecchio | G08B 5/36 340/541 |
| 2013/0215266 A1* | 8/2013 | Trundle | G08B 13/19602 348/143 |
| 2013/0215276 A1* | 8/2013 | Cho | G08B 13/19695 348/154 |
| 2014/0083188 A1 | 3/2014 | Helenelund | |
| 2014/0085125 A1* | 3/2014 | Ivtsenkov | G01S 3/30 342/45 |
| 2014/0281851 A1* | 9/2014 | McHale | F41G 1/38 715/202 |
| 2015/0247709 A1* | 9/2015 | Roberts | F41J 5/14 340/540 |
| 2015/0287312 A1* | 10/2015 | Mantsvetov | G08B 21/02 340/906 |
| 2016/0248972 A1* | 8/2016 | Garrison | H04N 5/23238 |

OTHER PUBLICATIONS

Alert Plus dated Oct. 7, 2015.
Game Alert Junior dated Oct. 7, 2015.
Deer Hunting, Black Bear Hunting and Elk Hunting Equipment dated Oct. 7, 2015.

* cited by examiner

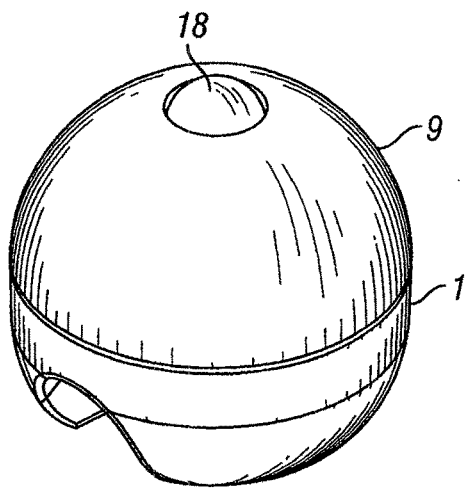
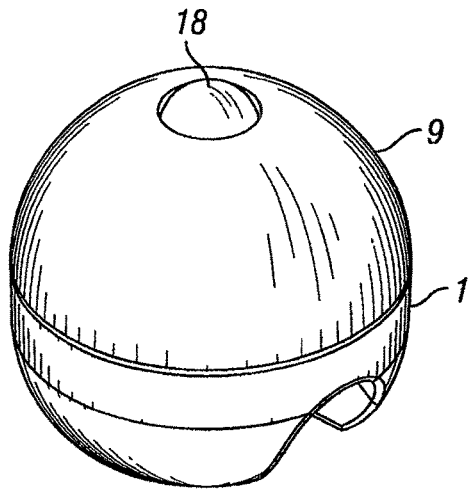
FIG. 1    FIG. 2
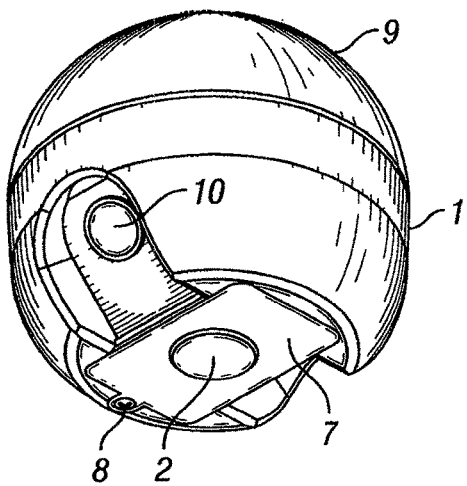
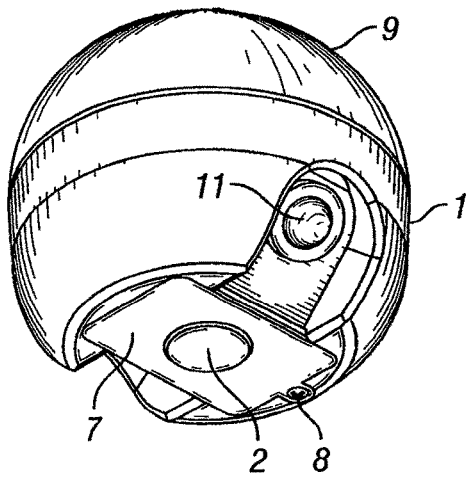
FIG. 3    FIG. 4

GAME ALERT SYSTEM

CROSS-REFERENCE TO RELATED APPLICATIONS

This application is a continuation-in-part of and claims priority from U.S. application Ser. No. 15/181,097, filed Jun. 13, 2016, which is a continuation of and claims priority from U.S. application Ser. No. 14/691,476, filed Apr. 20, 2015, now U.S. Pat. No. 9,380,776, which claims the benefit of priority from U.S. Provisional Application Ser. No. 61/981,522, filed Apr. 18, 2014, the entire disclosures of all of which are hereby incorporated herein by reference in their entirety for all purposes.

BACKGROUND

Feral hogs are wild hogs that are descended from domestic pigs that escaped or were released from captivity and have become a very successful invasive species, particularly in the Southern and Southeastern United States. The Texas Parks and Wildlife Department reports that it is estimated that more than 1.5 million feral hogs live in Texas alone at the time of filing of this application. Feral hogs are a destructive nuisance animal that competes with game and domestic livestock for food, destroys and damages crop plants and pasture and can also destroy fencing and other structures.

While many ranchers and land owners attempt to control hog populations through trapping and hunting of hogs, experience has shown that hogs quickly adapt and learn to avoid traps and hunters. While hogs have poor eyesight, they have well developed senses of smell and hearing and are extremely fast movers, making control methods difficult. Experience has also shown that when a hog population is hunted during daylight hours, those hogs quickly become nocturnal feeders, hiding during daylight.

Because of these behavior patterns, many hunters hunt hogs exclusively or primarily at night, most often around electric feeders that periodically throw corn or bait on the ground, or that can be controlled to throw feed on command. Various devices have been developed to aid hunters in night hunting of hogs, many of which are designed to illuminate the area around a feeder so the hogs can be seen at night. Light sources that illuminate the area around a feeder, or an area that contains one or more animals that are being hunted are sometimes referred to herein as "area lighting" unless the context of a particular use of the term is contradictive to that definition. Some products that have been tried are motion sensor lights that mount on a feeder and illuminate the ground around a feeder when motion is detected. This arrangement has drawbacks in that the animals are necessarily located between the light and the hunter which makes it difficult to see the hogs, particularly through a rifle scope at night. Another product is marketed under the name "Hoginator" and purports to solve this problem by providing a battery powered motion sensor light that mounts on a pole and points toward the feeder, thus providing better illumination and no "blinding" of the hunter by looking into the light. The Hoginator, however, can fail in a real world hunting environment, since when hogs converge on a feed area they are likely to destroy anything at ground level that comes between them and available feed.

Additionally, field studies of area lighting products have proven that the permanent night lighting of an area over an extended period of time (regardless of color of light) has an adverse effect on the game feeding at the lighted feeder. Deer, as well as larger hogs tend to avoid a lighted area if other feed sources are available. It is, therefore, counterproductive to a hunting property to employ a hog control method that negatively impacts conventional deer or exotic game hunts in an affected area.

In summary, there are inherent difficulties in attempting to adequately light a hunting area, thereby allowing a hunter to hunt from conventional hunting locations (existing hunting blinds) at night. The available products simply do not provide adequate light to take effective shots outside of a 30-50 yard range, as rifle mounted scopes cannot gather the needed light from an area light source in excess of 100 yards away and the keen senses of feral hogs make it necessary to hunt from a distance beyond the range of area lighting. There is a need, therefore for a stealth system of hunting feral hogs, including from a distance of at least 100 yards without relying on area lighting.

SUMMARY

The game alert systems and methods of the current disclosure provide solutions to at least some of the drawbacks of the prior art by providing novel improvements in the field, at least because the disclosed systems do not rely on illumination of the animal hunted or the hunting area. The present disclosure provides significant advantages, including as devices to be used with night vision equipment to hunt hogs or other species at night with no ground illumination in the hunting area, thus avoiding startling the hogs and also having no negative impact on other animals, such as game animals visiting an area to feed. The devices are also not ground mounted so they are not impacted or destroyed by game animals, livestock or hog movement in a given area.

The disclosure can be described in certain embodiments as a device mountable on a game feeder that detects motion in a 360° target area and automatically sends an electronic signal to a user, or a hunter, in a remote location to notify the hunter of movement in the area, without alerting or startling any animals that triggered the device. The device thus allows a hunter in a remote location such as a hunting blind or stand as far as 100 or more yards distant, to be aware of game in the target area and to see the game with night vision equipment, or with a laser flashlight, without producing light or sound that would startle the game.

It is a further aspect of the disclosure that the devices and methods can be effective in day light as well and are not restricted to night hunting. Electronic signals effective during night time or daylight can include, but are not limited to an LED indicator on the device or wired to the device, a laser light emitter directed at the hunter's location, either a pulse or steady beam; or a BLUETOOTH® or other wireless or hard wired device connected directly or indirectly to the motion detector that, upon receiving an input from the motion detector transmits a signal to a remote device at a hunter's location. The remote device can be a smartphone, audio or video output device, computer tablet, pad, laptop, pager, watch, notebook, or other wearable or portable electronic device configured to receive the signal and to provide an auditory, visual or tactile output to alert a hunter of game near the feeder. In one embodiment, the remote device may be included or incorporated into a piece of night vision equipment like a scope (such as may be attached to a rifle) or may be a separate unit which can be conveniently mounted or attached to a scope or a rifle. The output can be any appropriate audio signal, including but not limited to a beep, ringtone, or other sound, a text, a vibration, a light, or a combination of sound and vibration or sound, light and vibration. It is understood that any such sound is preferably of low enough volume not to startle any game near the feeder or the hunter. As such the device can also include headphones or earbuds. It is a further aspect that, in embodiments that include a laser emitter signal that the laser can be seen by the hunter, or can be aimed at a device that responds with a secondary signal.

While the disclosure is being described in terms of hunting and night hunting of hogs in particular, it is understood that devices described here are not so limited and can also be used for non-lethal activities such as photography, film, or live capture methods, and with respect to any appropriate animal species, including but not limited to wild, feral, agricultural livestock or domesticated animals.

While not being limited to any particular mounting system, in certain embodiments the Game Alert is configured to be affixed to the underside of a conventional feeder, and such a system can be powered by a dedicated battery pack attached to the unit itself or by permanent wiring to an existing feeder battery or power source that is also powering the feeder.

During use of certain embodiments, the Game Alert can be mounted on a feeder as described, while a hunter or other user is positioned at a distance from the Game Alert unit. The unit can then be triggered by game or animal movement around the alarmed feeder. In a basic embodiment, triggering of an inline nighttime LED motion sensor switch can send voltage to a small 12V LED emitter affixed to a clicktight strip light DC plug connector. An LED adapter splice cable is used to connect to a 12V power source. The lighted LED light notifies the hunter to the presence of animals near the feeder. In those instances when a hunter is positioned from 100 to 500 yards from the feeder, a rifle or scope-mounted illuminator can be activated to illuminate the area near the feeder and to identify an animal.

While the current disclosure is being described in terms of a preferred type of sensor, a day or a night time motion sensor, the invention is not limited to a particular sensor. For example, the described devices and systems can be adapted to use any type of sensing device known in the art that can alert a user to the presence of animals in the target area. Such sensors include, but are not limited to passive infrared heat sensors, ultrasonic and microwave sensors, and acoustic wave or vibration sensors.

The Game Alert system thus allows a hunter to sit and wait for game in darkness or low light conditions, or to wait in daylight without having to concentrate or even stay awake for long periods while waiting for animals to approach a feeder. With Game Alert the hunter can simply sit comfortably waiting for Game Alert to trigger, notifying the hunter to ready rifle, illuminate and shoot.

An initial prototype system was constructed with the electronic components contained in a water-proof and varmint-proof containment housing. The prototype was constructed of schedule 40 PVC and included a CORONIS 77 LED strip light in Red and a click tight strip light DC connector plug. It is understood that the containment box and piping can be made of other materials known and used in the art, including but not limited to metals such as aluminum or stainless steel, ceramics, plastics or high density polymeric materials, for example. The use of all such materials is contemplated by the present disclosure.

In certain embodiments the disclosure can be described as a motion-activated, stealth hunting light designed specifically for night hog hunting around feed areas, hog wallows, or trails. The light features a magnetic base for easy installation on the bottom of metal feeders. In a preferred embodiment the alert light is a motion-activated, single-point, red LED that is triggered by the movement of any animal with a total body area larger than 3 square feet. Once activated, the light can stay on for a total of 10 seconds before turning off. If motion is still detected after 5 seconds of being deactivated, the LED will re-illuminate. The light intensity is so low and pointed or shielded in a way that it does not illuminate the ground underneath the device and thus does not change game behavior, yet it is highly visible to the hunter. Certain embodiments also include a two-position illuminated rocker switch that energizes the hunting light, confirming battery power output and that internal circuitry is activated. During use, microcircuit technology contained in the device senses game activity and energizes the red LED emitter/indicator, notifying the hunter that game is present.

The disclosed systems can also be combined in a kit or package for commercial sale, including a rifle-mountable green light emitting diode (LED) flashlight. Once the sensor has sensed animal movement and illuminated, a hunter can activate the green LED light on the flashlight by pressing a Tactical Pressure Switch, allowing him or her to quickly scan the area for hogs and take aim.

In preferred embodiments the alert device housing can be constructed of metals such as stainless steel or aluminum, or of ceramic or polymeric materials. Certain embodiments are constructed of acrylonitrile butadiene styrene (ABS) u/v weather resistant polymer resin, injection molded from a machined injection tool, and powered by a 9-volt battery.

The current disclosure can also be described in certain embodiments as methods of communicating information or alerts regarding animal movement from the vicinity of a game attracting device or area to a remote location. The methods allow a hunter, in particular, to monitor an area that is in darkness, or to monitor multiple areas simultaneously, and be alerted when a particular area or feeder has animal movement nearby. It is a further aspect of the methods that the LED notification device can be seen from a long distance, even a mile or more in darkness and that the user in a far remote location can monitor widely scattered sensors and can move to a hunting area where animals have been detected when alerted to the presence of an animal at one or more remote locations.

The methods can be described in certain embodiments as providing one or more presence detector modules in one or more areas where game or wild hogs will be attracted, such as a feeder, for example, and in one or more places where a hunter will have a view of the sensor area(s) from a distance of 50, 100, 200, 300 or even 500 yards. The provided sensors can include a housing, a first electronic circuit, and a presence sensor at least partially contained in or attached to said housing, and electronically connected to said first electronic circuit. The presence sensor can be any appropriate sensor that detects movement, heat, or movement and heat, for example, and generates an electronic signal when there is a detection event meeting predetermined criteria. The sensors are described in certain embodiments as a motion sensor module, but can also detect body heat or even sound, for example. All methods of presence detection known in the art are contemplated by the current disclosure and are not limited to the detection of motion.

In certain methods, the sensor module can include radiofrequency notification and also includes an integrated indicator light source electronically connected to said first electronic circuit and adapted to be activated by a signal received from the presence sensor in which the indicator light is positioned on or in the housing to be visible from a distance of at least 100 yards from the housing and to be shielded from illuminating the ground area within the detection cone of the presence detector. Although the cone of detection varies for different situations and can be selected by a user, the light can also be shielded from the area beneath the sensor module for a circular distance of 10, 20, 30, 40, or 50 feet in diameter, for example, so that the detected animals, whose eyes are typically 1, 2, or 3 feet from the ground, for example, do not see the light. This light is useful to be used as the sole notification for a simpler set up, or to provide a backup system in the event that interference, weather, failure of a receiver device, or other issues make the wireless communication systems impractical, or temporarily unavailable or unreliable.

The sensor modules for use in the disclosed methods can also include, in certain embodiments, a radio frequency transmitter or transceiver device contained in or attached to the housing and electronically connected to the first electronic circuit and adapted to be activated by a signal received from the presence sensor; and a power source or a connector for an external power source connected to the first electronic circuit. The first electronic circuit is adapted to control the presence sensor, and to control the interaction of the presence sensor with the light source and the wireless communication device. The electronic circuit can include an identifier code that is transmitted via the radiofrequency transmitter or transceiver so that the receiving device can identify which particular module of a plurality of modules has sent the alert.

The disclosed systems and methods can further include providing a hub device, typically adapted to be physically located near the hunter, typically in a position where the hunter can see the hub, or hear a low level sound or vibration signal when the hub receives a signal from a detector module. The hub device can include a second electronic circuit and a power source connected to said second electronic circuit, a radiofrequency receiver or transceiver electronically connected to said second electronic circuit and adapted to receive radiofrequency transmissions from said radiofrequency transmitter or transceiver in or attached to one or more detector modules. The hub can also include one or more of one or more indicator lights, each associated with a particular presence sensor module of a plurality of modules and electronically connected to said second electronic circuit and adapted to be activated in response to a signal from said second electronic circuit, a vibrating device electronically connected to said second electronic surface and adapted to be activated in response to a signal from said second electronic circuit, and a short range wireless transmitter electronically connected to said second electronic circuit and adapted to transmit a wireless signal for a range of up to about 100 yards and adapted to be pairable to a pairable device selected from a cellular phone, smart phone, tablet, pad, pager, laptop, or watch. The term "pairable device" is meant to convey its normal meaning in the art, and is descriptive of transmission protocols such as BLUETOOTH® or other wireless protocols in which receiving devices are recognized or paired by the transmitter device.

In certain embodiments, the second electronic circuit can include a chip and memory adapted to receive a transmission and identify the particular presence detector module from which a transmission is received, to activate an indicator light, a vibratory mode, or both associated with the identified presence sensor module and to transmit a signal over the short range wireless transmitter to one or more paired devices including information received from the radiofrequency transmission.

It is a further aspect of the disclosure, in certain embodiments that a transmitter or transceiver in a detection module can communicate directly with a receiver such as a device selected from a cellular phone, smart phone, satellite phone, tablet, pad, pager, laptop, scope or other night vision equipment, or a unit which is adapted to be removably attached to a scope, piece of night vision equipment, a gun, or watch, in each case without going through a hub. Examples of such systems and methods include a cellular or Wi Fi signal transmitter in the detector module, for example.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 1 is a perspective top view of an embodiment of the disclosure.

FIG. 2 is a perspective top view of an embodiment of the disclosure as rotated with respect to FIG. 1.

FIG. 3 is a bottom perspective view of an embodiment of the disclosure.

FIG. 4 is a bottom perspective view of an embodiment of the disclosure.

While the figures are described in terms of a top and a bottom of the device, it is understood that the device can be mounted under a game feeder for example, "upside down,"

or with the sensor pointed down, or it can be mounted in certain embodiments with the sensor pointed up, as shown in some of the drawings. The choice of the term "top" or "bottom" is, therefore, arbitrary and merely used for convenience in describing the various embodiments described herein.

DETAILED DESCRIPTION

A preferred embodiment of a game alert device is shown in the several views of FIGS. 1-11. The device as shown includes a two part housing, including an upper housing 9 and lower housing 1. The housing parts can be assembled as shown by a threaded interlock such that the housing can be screwed apart, or it can be closed with a friction fit, a latch or adhesive bond. It is also understood that the housing can be provided in a single part, or in three or more parts as appropriate.

The assembled housing 9 as shown is in the shape or configuration of a spheroid, or elongated spheroid and is of a size that is compact enough to be lightweight and unobtrusive, but large enough to contain the internal components. The generally spheroidal shape is adopted at least in part to maximize the smooth shape of the device and to minimize animal damage caused by chewing or scratching on corners or edges of the device. The device can be provided, however, in any other shape or configuration, included, but not limited to a cuboid, cylindrical, rectangular cylindrical, triangular pyramidal, rectangular pyramidal, cone, truncated cone, frustrum, hexahedral, heptahedral, octahedral, nonahedral, decahedral or dodecahedral, for example, or combinations of any of these, or representative of an object, for example. All such variations, including irregular solid figures not named can be used and combination of any of such shapes would fall within the spirit and scope of the appended claims.

The housing 9 is preferably constructed of a durable material that is weather resistant and animal resistant and would include metals such as steel or aluminum, or coated metal materials, or ceramic or polymeric materials that can be machined or molded into the appropriate shapes.

Figure 10:
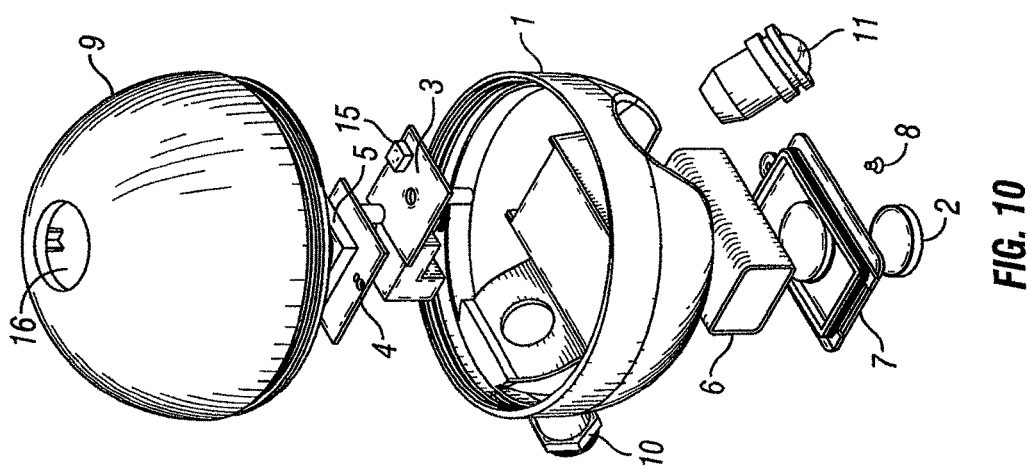
FIG. 10 is an exploded view of an embodiment of the disclosure.

As shown in the exploded view of FIG. 10, the device can be attached or placed on a feeder, such as on the bottom of a feeder and held in place by an attachment means such as a magnet 2, or other fastening means such as screws, rivets, bolts, clamps, a belt or adhesives, for example. It is understood that the device can also be attached to other objects such as trees, poles, etc. or if using a magnet as shown, the device can be magnetically attached to a metal object or plate attached to a feeder or other object. The upper housing provides an opening 16 into the interior of the housing configured to accept and contain the sensor apparatus 18, a part of which projects from the interior of the housing through the opening 16. In certain embodiments the sensor can be adjusted or configured to detect only the presence of large animals to prevent "false alarms," or can be configured to transmit a different or distinguishable signal when triggered by a large vs. a smaller animal, such as a small varmint such as a rabbit, raccoon, coyote or fox vs. a feral hog, for example, or to distinguish a hog from a larger animal such as a deer, cow or horse, for example.

The sensor device in this particular embodiment is mounted on a sensor board 4, and is protected by a sensor cover 5, and is connected to a control board 3, that provides the electronic control circuitry. The circuit board is also connectable to a power source. In the embodiments shown, the power source can be one or more batteries 6, and can be a 9 volt battery as shown or 1, 2, 3, or more AA or AAA batteries. The batteries are contained within the housing and are accessible by a battery door 7 that can be secured with a battery door screw 8 or other devices. In most applications, it is anticipated that the sensor 18 will provide a 360 degree field of detection underneath the device, thus providing a target or detection area underneath the device of essentially a conical shape with a bottom area on the ground in a circular shape of anywhere from about five feet in diameter, to twenty feet in diameter, or even to fifty feet or more in diameter, depending on the height of the device in operation and the terrain and features of the target area involved. It will be appreciated, however, that the sensor could instead provide a smaller field of detection and would still be within the scope of the present disclosure.

In the embodiment shown in the figures, the lower housing 1 also provides openings for insertion of a power switch 10 and an LED indicator light 11 that can inform a user at a distance that the motion has been detected. In the embodiment shown, the LED is contained in an alcove or recess designed to shield the light of the LED from animals near the device or within the cone of detection of the sensor. It will be further appreciated that the LED indicator light 11 can be mounted to the housing 1 by a swivel device so that a user can move and adjust the direction in which the LED light 11 points, such as aiming the LED light 11 towards a blind used by a hunter.

Figure 5:
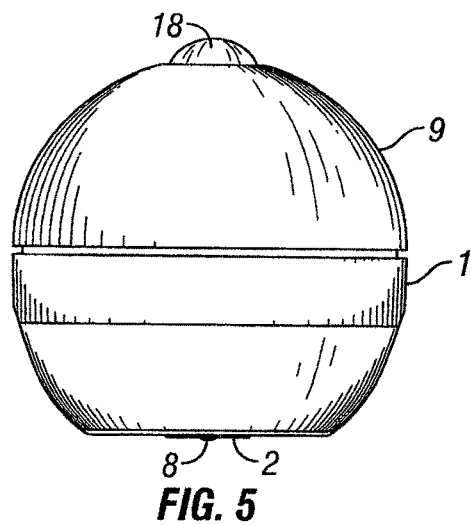
FIG. 5 is a side plan view of an embodiment of the disclosure.
Figure 6:
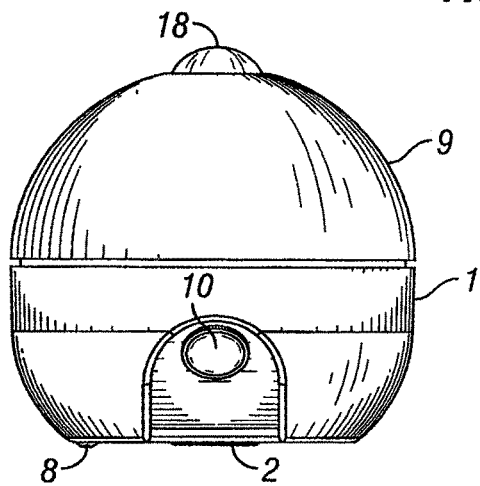
FIG. 6 is a front plan view of an embodiment of the disclosure.
Figure 7:
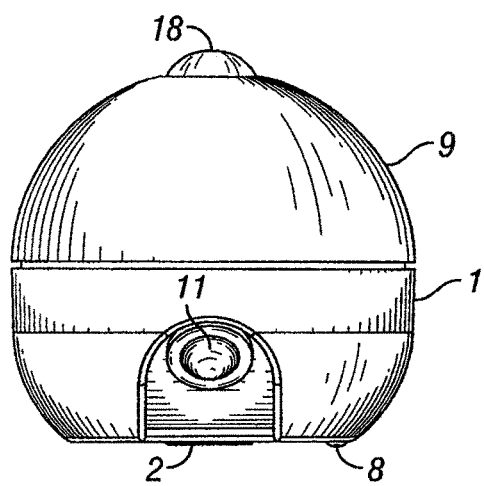
FIG. 7 is a rear plan view of an embodiment of the disclosure.
Figure 8:
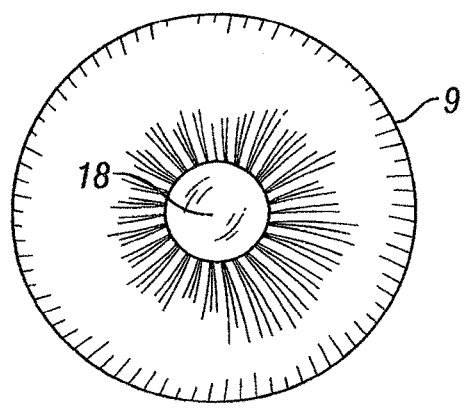
FIG. 8 is a top plan view of an embodiment of the disclosure.
Figure 9:
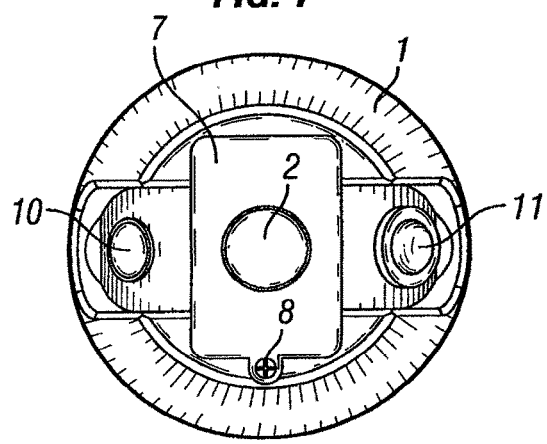
FIG. 9 is a bottom plan view of an embodiment of the disclosure.
Figure 11:
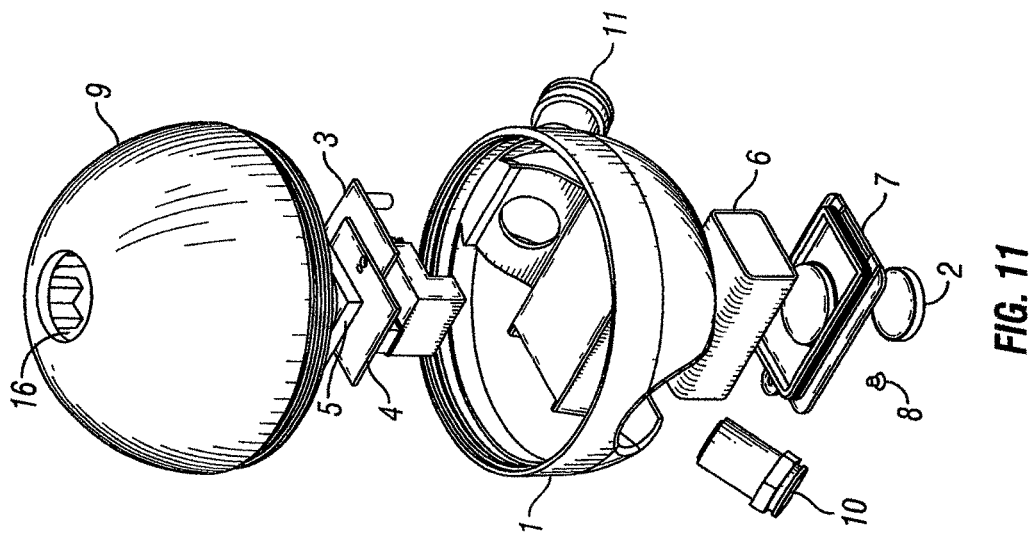
FIG. 11 is rotated view of the exploded view of as in FIG. 10.

As described above, the device can be in wired or wireless communication with a transmitter device to send an alerting signal to a user at a distance of 100 yards, or even 200, 300, 400, or 500 or more yards from the device. The transmitter can send a radio, cellular, or other appropriate signal and can in certain embodiments be equipped with an antenna to receive signals from a user to configure or operate the device. A transmitter or transceiver 15 as described is represented in FIG. 10 as incorporated into the electronic circuit board, but can also be placed elsewhere within the housing or external to the housing. FIG. 11 is a rotated exploded view showing the components as in FIG. 10 except that the optional transmission device is not included.

Figure 12:
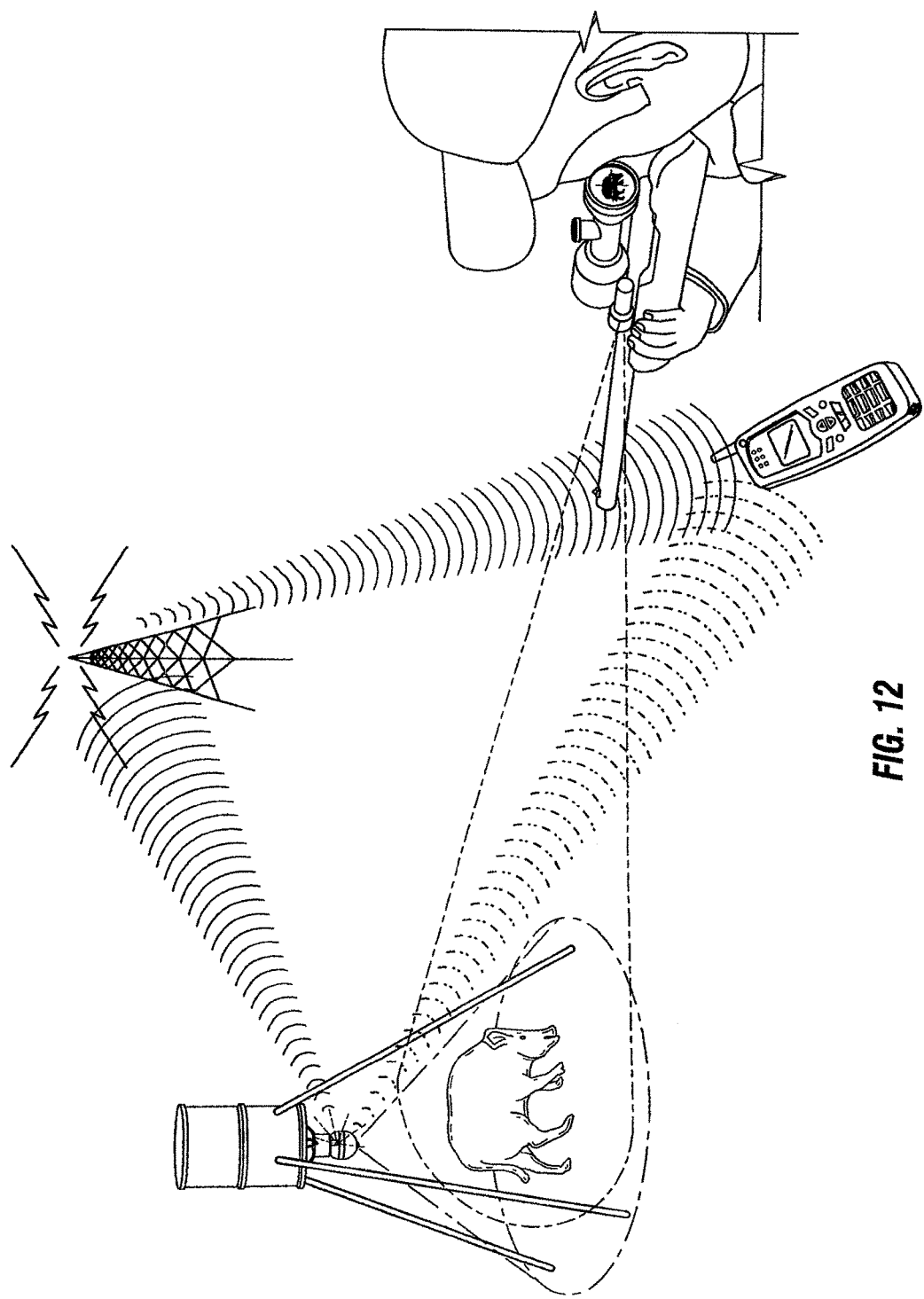
FIG. 12 is an illustration of use of embodiments of the disclosure in which a hunter is notified of the presence of an animal near a remote feeder.
Figure 13:
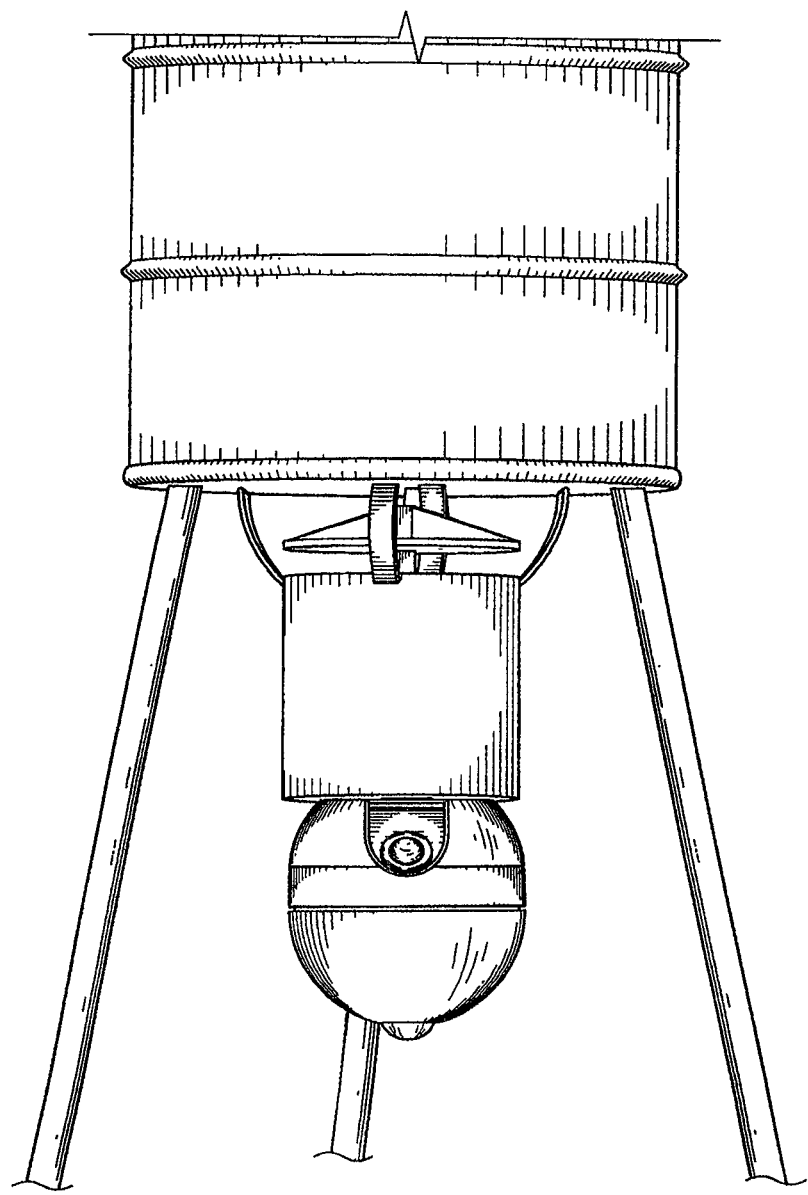
FIG. 13 is an illustration of an embodiment of the disclosure disposed under a game feeder. The drawing is not to scale.

FIG. 12 is an illustration of embodiments during use. As shown, a hunter or other user can attach a device to the bottom of an automatic or manually controlled game feeder with an integrated magnet or other attachment means as shown in FIG. 13, and power the device on. The device in FIG. 13 is not drawn to scale with respect to the feeder, but is enlarged for emphasis. The user can then sit in a remote deer blind or stand in darkness or light from about 50 yards, 100 yards to 500 or more yards distant from the feeder and wait for a signal from the motion detector device to know that game is in the vicinity of the feeder. When receiving such a notification in darkness, the user can activate a scope or rifle mounted light, preferably a laser for a period only long enough to identify the game and take aim. In this way the other animals in the area are less likely to spook and run away from the feeder.

The signal can be transmitted from a radio, microwave or cellular transmitter in communication with the sensor device to the user's smartphone, cell phone, pager, tablet or other computer as an audio, visual, vibratory, text signal or any combination thereof to alert the hunter to the presence of motion near the feeder.

In one embodiment, the transmitter on the device can be configured to send a signal to a receiving device, such as a smartphone or other device as described herein with an application installed and running thereon, to alert the user to the presence of a certain size of animal, or to a hub device that communicates with the smartphone or other device as described herein. The application can be configured to provide the alert via sound, vibration, a visual cue, and/or other means, and the alert can vary depending on the size of the animal. For example, a signal indicating that a small animal such as a rabbit or squirrel has been detected can be used by the application to display a small rabbit silhouette on the smartphone. A larger animal can result in the display of a hog silhouette, and a still larger animal can result in the display of a deer silhouette.

Figure 14:
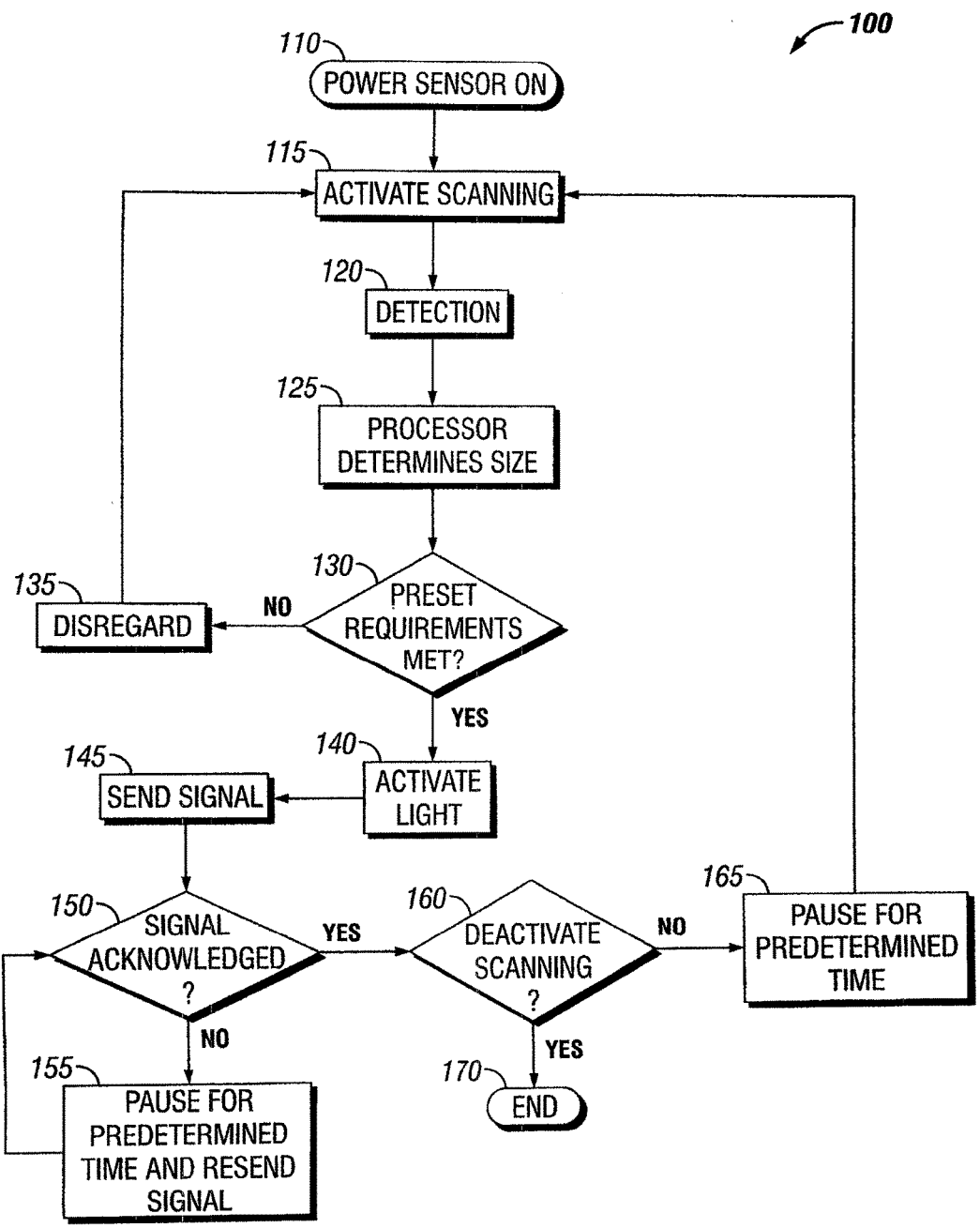
FIG. 14 is a flow diagram illustrating a method of use of the disclosed devices.

An embodiment of use of a device as disclosed is described in FIG. 14. As seen in the figure, a user powers the sensor on 110, which activates scanning 115. Scanning can be continuous or periodic as appropriate to the situation. When the sensor detects the presence of an animal 120, the processor determines the size or category of size of the animal 125 and compares the data to preset requirements 130. If the animal does not meet the preset limits the signal is disregarded 135 and the device resumes scanning 115. If the detected animal falls within the preset limit the device activates the light 140 and optionally causes a transmission device to send a signal 145 to a user. The user can then optionally send a return signal or otherwise acknowledge receipt of the signal 150. If the signal is not acknowledged, the device can pause for a predetermined time and then resend the signal 155. If the signal is acknowledged the device can deactivate scanning 160 for a predetermined period 165. In certain embodiments the device continues to activate the signal for as long as animals are detected, either continuously or at a predetermined interval. Alternatively, the device can be programmed to end 170 until reactivated by a user to return to active scanning 115.

Figure 15:
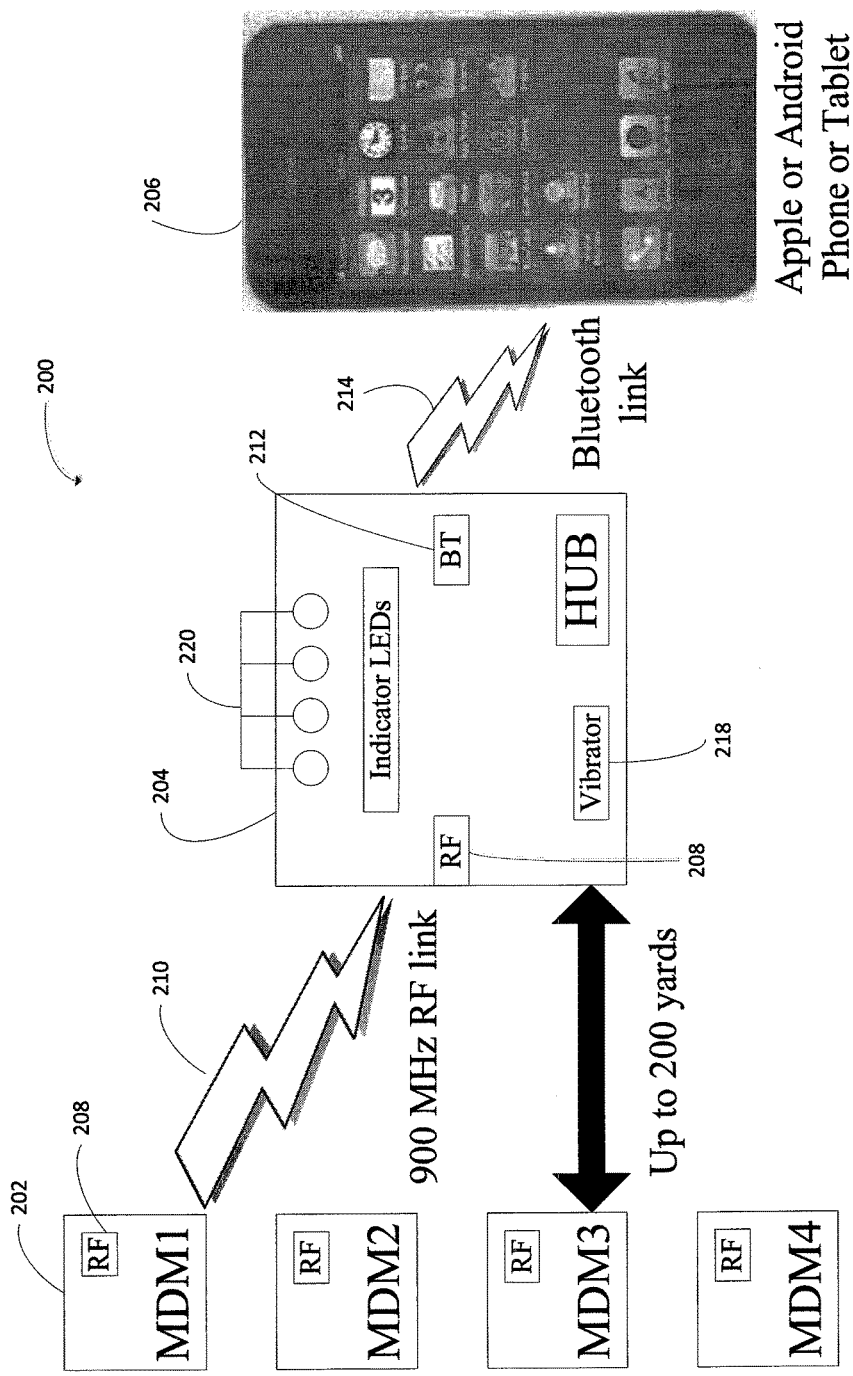
FIG. 15 is an illustration of an example of a communication link from four detector modules to a hub to a cell phone or tablet, as used in embodiments of the disclosed devices and methods.
Figure 16:
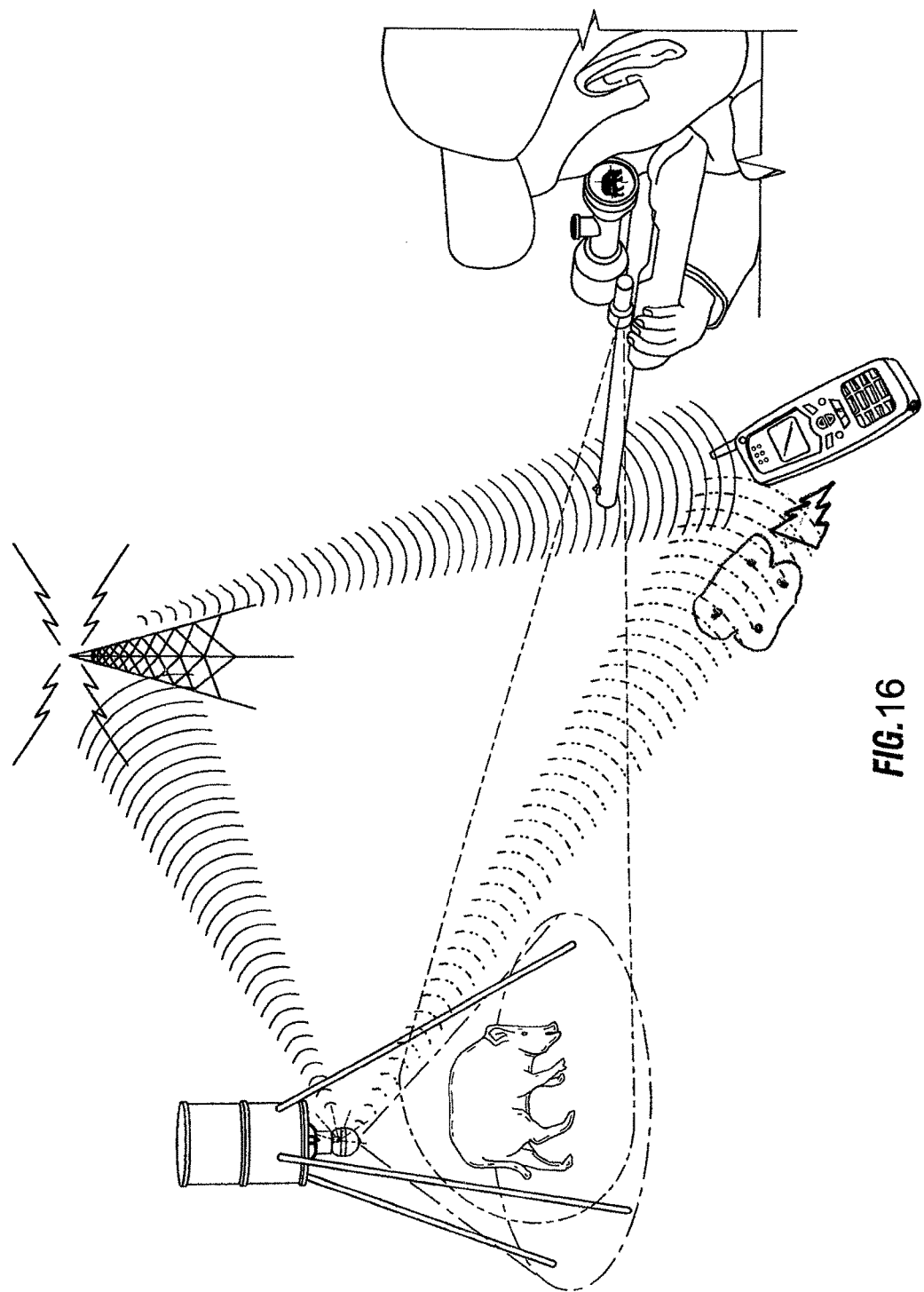
FIG. 16 is an illustration of use of embodiments of the disclosure in which a hunter is notified of the presence of an animal near a remote feeder wirelessly with or without the use of a hub device.

In certain embodiments a game alert system 200 can include one or more sensor modules, or motion detector modules (MDM) 202, a hub device 204 and a mobile device such as a commercially available smart phone, tablet, pad, pager, laptop, watch, or other wearable or portable electronic device 206 adapted to receive a wireless signal 214 and to produce a visual, auditory, and/or tactile or mechanical (vibratory) output in response as shown in FIG. 15.

In certain embodiments an MDM 202 can include a passive or pyroelectric infrared (PIR) motion sensor (not shown in FIG. 15), a radio frequency (RF) communication module 208 and a power source such as a battery (not shown), or a connection to an external power source. In certain embodiments the MDM 202 is designed to operate on extremely low power usage principles to attain maximum possible battery life. Each MDM 202 can have a unique ID encoded in the electronic hardware. It is also understood that the MDM 202 can be configured to communicate directly with a smart phone or other electronic device in addition to or alternatively to the described RF link.

It is contemplated that one or more MDMs, each with a separate address can communicate over an RF link with one hub 204. For example, 1, 2, 3, 4, 5, 6, 7 8, 9, 10 or more MDMs can communicate with a single hub. It is also contemplated that one or more MDMs can communicate with more than one hub 204, if two or more hubs are placed within range of a single MDM 202. The hub 204 can act as the master and the MDMs as slaves in the communication network. The communications can include the steps of establishing a link with a hub 204, maintaining a link with a hub, maintaining the link via a heartbeat signal, reporting motion detected in the vicinity of an MDM 202, and reporting diagnostic information in case of errors detected on an MDM 202. The RF communication link 210 can be the ISM 900 MHz license-free band assigned by the US government's FCC, which is typically effective for distances of more than 200 yards (182 meters) between an MDM 202 and a hub 204.

In certain embodiments, a "heartbeat" signal is used. With this feature, the hub 204 will periodically send a signal to each MDM 202 and await a response signal from the MDM 202 as a check to see if the MDM 202 is still in operation and in communication with the hub 204. The hub 204 can be programmed so that, if one or more MDMs fail to respond to a heartbeat signal from the hub 204 for more than three minutes (for example), then the hub 204 will interpret this condition as meaning that the MDM 202 is no longer operational, and the hub 204 will then send an appropriate alert signal to a user's device and/or display an appropriate alert message on a display of the hub device 204. Those skilled in the art will appreciate that the selection of the timeout can be shorter or longer than three minutes, and it may be appropriate to allow the user to specify a set time to take account of then existing conditions.

In a preferred embodiment the software in the hub 204 and MDM 202 are configured to automatically connect with each other without user intervention. The software on the hub 204, for example, also is configured to detect each MDM's address or identifier and, if two different MDMs have the same address, report this condition as an error to the user. Similarly, the software on the MDM 202 can be configured to report an error if responses are detected from more than one hub 204.

In addition to an RF module in the hub 204 to communicate with the MDMs, the electronics in the hub 204 can further include a short range or near field radio transmission device such as a BLUETOOTH® device 212, for example, that exchanges data over short distances, up to 100 yards for example, using radio transmissions, preferably in the unlicensed industrial, scientific and medical (ISM) band at 2.4 to 2.485 GHz, using a spread spectrum, frequency hopping, full-duplex signal at a nominal rate of 1600 hops/sec. The hub 204 can thus communicate with a mobile device such as a cell phone, smart phone, tablet, pad, pager, laptop, watch, or other wearable or portable electronic device configured to communicate with a short range radio device such as a BLUETOOTH® signal 214 transmitter and to produce a visual, auditory, and/or tactile or mechanical output in response to the signal. In certain embodiments, the software on the hub 204 can communicate with any commercially available operating system such as Android or Apple (iOS) devices 206, for example. The user communication device may also be an item of night vision equipment (not shown), such as night vision goggles, a night vision monocular, night vision binoculars, or a night vision scope, or may be a separate unit (not shown) which can be easily attached and/or detached from such equipment. In such situations, for example, the user might removably attach the unit to night vision goggles for a given situation, and might then remove the unit from the night vision goggles and then attach it to a scope. Thus, the separate unit offers a great deal of flexibility and convenience to a user who may choose to use the unit with various pieces of equipment.

A hub 204 can also include a vibrating mechanism 218, which can be configured to vibrate when a signal is received indicating motion in the vicinity of one or more MDMs. The hub 204 can further include one or more visual indicators, such as individual LEDs 220, each of which lights in response to a signal from an individual MDM 202 linked to the hub.

In certain preferred embodiments, therefore, a system is provided which provides the advantages of extremely low power operation for maximum battery life, automatic pairing of MDMs with a hub 204 without user intervention, automatic detection of duplicate MDMs and notification to a user, automatic detection of multiple hubs responding to the same MDM 202 and notification to a user, periodic heartbeat signal from the MDM 202 to the hub 204 and notification to a user if an MDM 202 goes offline, visual (flashing LED and mechanical or tactile (vibration) indication in a hub 204 when motion is detected by an MDM 202 in the field, ability for user disabling of vibration on the hub 204 via configuration screens provided by an app on a mobile device, and ability to communicate with multiple operating systems such as Android and iOS.

In another embodiment (not shown herein), the LED of the device can be mounted near the top of the device, and can be provided with a swivel mounting. In this embodiment, the device can be located on the ground, on a tree, or in another position, and the LED can be manipulated by a user to point towards a desired location, such as a blind in which the user will be waiting during operation of the device.

Figure 17:
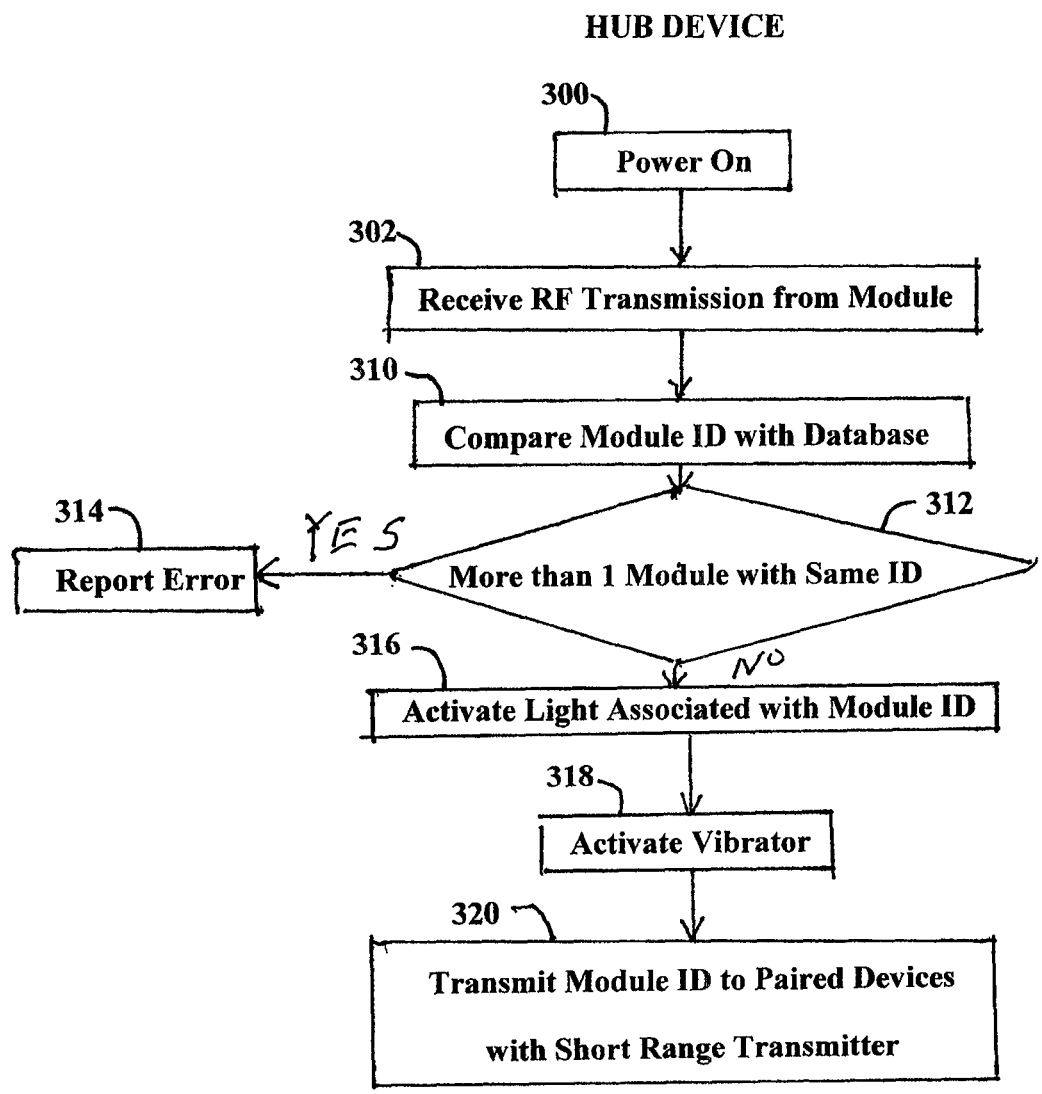
FIG. 17 is a flow diagram illustrating a method of communicating information about a remote location to a hunter.

An embodiment of a method of the current disclosure is illustrated in the flow diagram of FIG. 17. The method illustrated in FIG. 17 represents the activity of a hub device 204 that receives communication from a sensor module as illustrated in FIG. 15. As shown in FIG. 17, the hub device 204 is powered on 300, receives a radiofrequency signal from a module 302, reads the identification code for the sending module 310 and any additional information transmitted, such as information about the size of the detected animal(s). The hub 204 then determines if more than one module 202 is sending the same identification code 312. If two or more modules are sending the same identification code, an error message is transmitted 314 and the process ends. If the identification code is unique to one module 202, the hub 204 activates an indicator light associated with the identified module 316, activates a vibrating device 318, transmits a short range transmission including the identity of the module 202 and any associated information to a paired device 320, or any combination thereof. It is understood that the hub device 204 can be adapted to execute any one, any two, or all three of the notification methods, and any of the notification methods can be turned off or on as needed.

Figure 18:
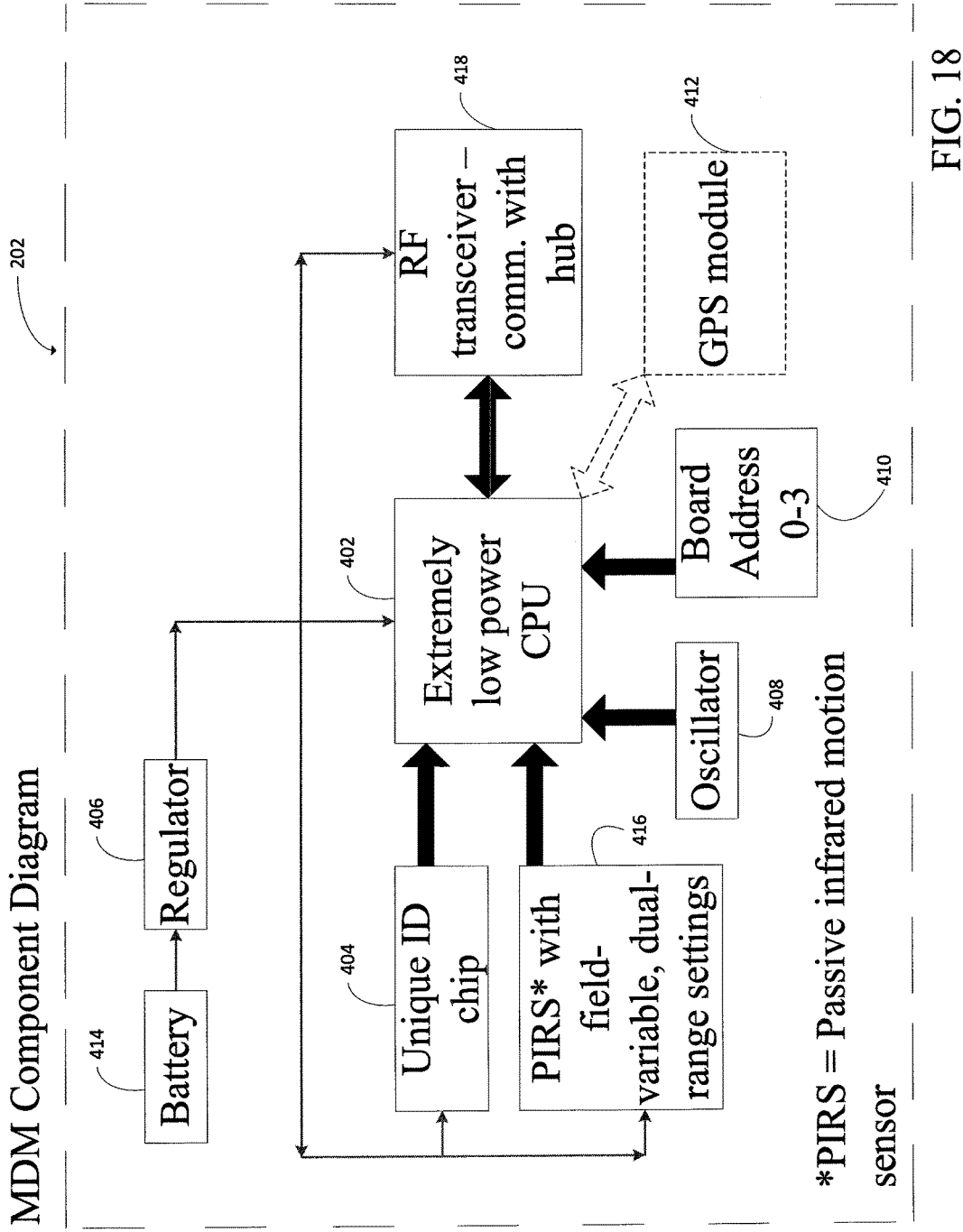
FIG. 18 is block diagram illustrating the circuit design of an MDM.

FIG. 18 is a block diagram illustrating a circuit which can be used with a MDM 202. As shown in FIG. 15, an MDM 202 can include a passive or pyroelectric infrared (PIR) motion sensor, a radio frequency (RF) communication module, and a power source such as a battery, or a connection to an external power source. FIG. 18 shows that a MDM 202 can further include an extremely low power CPU 402, an ID chip 404, a regulator 406, an oscillator 408, a board address module 410 and a GPS module 412. In this embodiment, a battery 414 serves as a power source and delivers power to the extremely low power CPU 402 and other components in the MDM 202 through the regulator 406. The regulator 406 controls the voltage and current entering the components of the MDM 202 and in turn controls the power consumption of the entire MDM 202. The extremely low power CPU is in communication with the ID chip 404, the passive or pyroelectric infrared (PIR) motion sensor 416, the oscillator 408, and the board address module 410 and a RF communication module 418. The PIR motion sensor 416 is programmable to have field-variable, dual range settings, thereby allowing the user to dictate how it may be triggered. When PIR motion sensor 416 detects one or more animals in the target area, the PIR motion sensor 416 sends at least one signal to the extremely low power CPU 402 to indicate that it has been triggered. The extremely low power CPU 402, through the RF communication module 418, is able to communicate with the hub 204 wirelessly over radio frequency.

The ID chip 404 can be programmed such that no two MDMs 202 are shipped with the same ID number, allowing each MDM 202 to be uniquely identifiable. This is important because a hunter using a second set of MDMs and hub 204 may be operating nearby to a first set of MDMs and hub 204. An MDM 202 in the second set of MDMs and a hub located nearby might be the case if located on a periphery bordering the property on which the first set of MDMs and hub are located, and may fall within RF range of the hub 204 within the first set of MDMs and hub. However, because each MDM 202 has an ID chip 404 that is programmed with a unique ID number, the hub 204 from the first set will be able to recognize that the MDM 202 that it is communicating with is not an MDM 202 belonging to the first set.

In one embodiment, each MDM 202 can be provided with one or more toggle switches to assign to the MDM 202 an identifier, such as one of "1," "2," "3," and "4", to indicate that that particular MDM 202 is (for example) number 2 of four MDMs associated with a hub 204. The MDM 202 can be provided with an openable cover to allow a user to gain access to the switches and manually toggle them as appropriate. If, for example, a 204 hub establishes connections with several MDMs, but two or more of the MDMs provide the same identifier to the hub 204 as for another MDM 202 with which the hub 204 is in communication, the hub 204 is programmed to respond to such a signal by generating an alert or error message for the user to identify the problem and the MDMs involved. The user, upon seeing such an alert or error message, which can be provided visually by the hub 204 and/or transmitted to a user device in wireless communication with the hub, can then manually adjust the switches on the MDMs until each MDM 202 in communication with that hub 204 has a unique identifier. (Alternatively, the user can simply ignore the alert or error message if the MDMs which are the subject of the message are not MDMs of current interest to the user, such as if the user is planning to use a different MDM (which is not the subject of the alert or error message) and does not plan to use the MDMs which are the subject to the alert.

Figure 19:
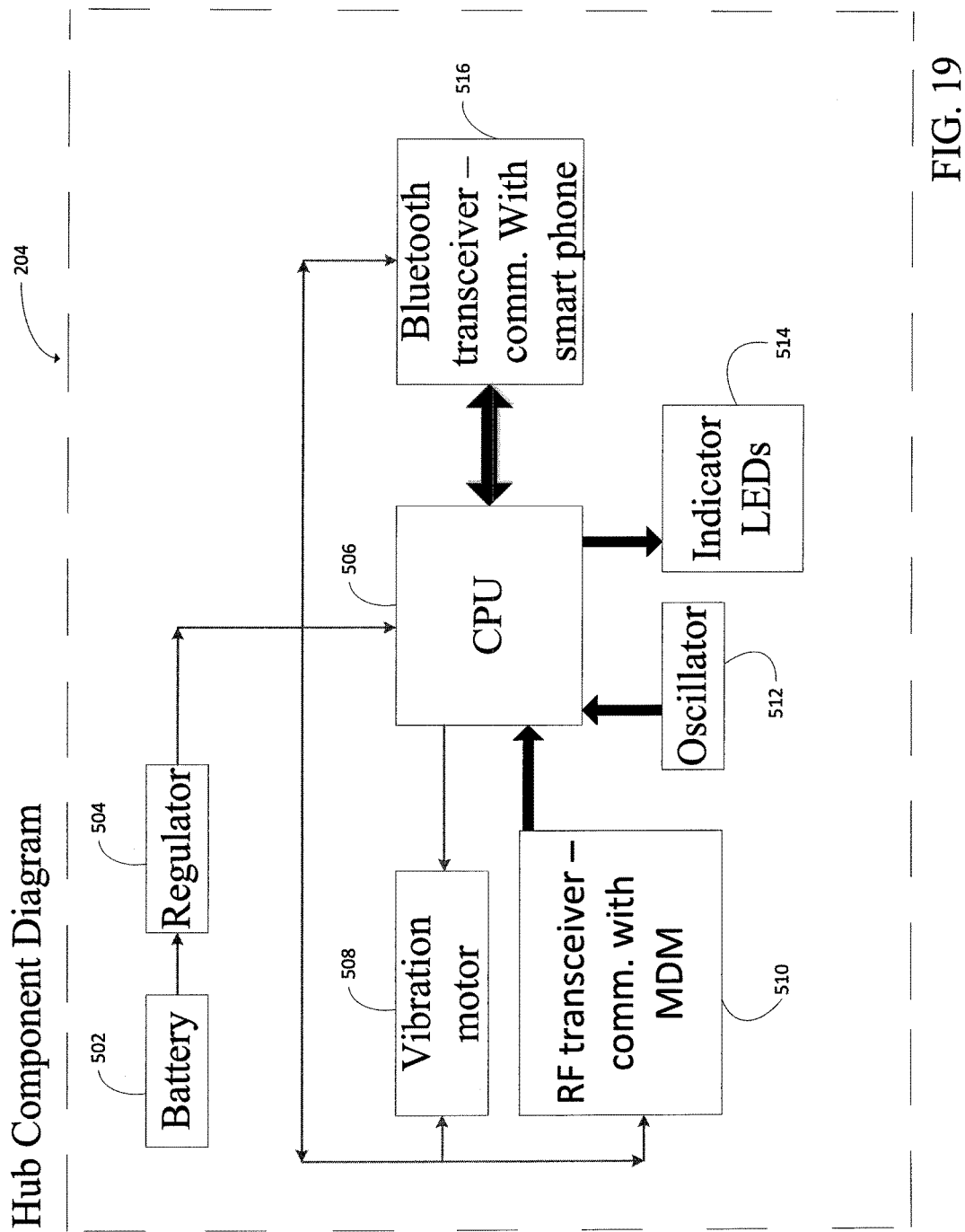
FIG. 19 is a block diagram illustrating the circuit design of a hub.

FIG. 19 is a block diagram illustrating a circuit which can be included in a hub 204. The hub 204 can include a battery 502, a regulator 504, a CPU 506, a vibration motor 508, a RF communications module 510, an oscillator 512, a set of indicator LEDs 514, and a BLUETOOTH communications module 516. The power source for the hub 204 can be an external power source or other power source; in this specific embodiment, it is a battery 502. The CPU 506 and other components of the hub 204 are powered by the battery 502 through a regulator 504, which controls the voltage and current entering the hub's 204 other components and in turn the power consumption of the entire hub 504. The RF communications module 510 is in communication with the RF communications module 418 of an MDM 202. When RF signals are received by the RF communication module 510, it sends those signals to the CPU 506. The CPU 506 in turns sends signals to the vibration motor 508 and the set of indicator LEDs 514 as appropriate to notify the user visually and/or by tactile feel of the detection of one or more animal(s) and the sensor(s) which detected the animal(s). The CPU 506 is also responsible for sending signals to the BLUETOOTH communications module 516, which allows for wireless communications with other BLUETOOTH capable devices such as a smartphone.

In yet another embodiment (not shown herein), one or more cameras can be included in the device, or the device can include connections operable to connect to one or more externally and/or internally located cameras. The device can be configured so that the camera takes photographs at regular intervals, which can be set by a user, or can be configured to begin taking photographs when motion is detected, or when a particular type of motion and animal has been detected, such as when a larger animal has been detected. Moreover, the camera can be configured to take video and sound, not just still images. The camera can be adapted to take photographs, video, and/or sound in a night vision format, a regular format, or other formats, such as high definition or in lower resolution formats. The camera or cameras of the device can also be configured to provide panoramic or 360 degree views (and resulting photographic images and/or video) of the target area or the area around the device. In such applications, it is expected that the camera will provide a 360 degree field of view around the device, such as by providing an image of the essentially conical area under the camera. The camera can be a night vision camera if desired, can be adapted for taking images or movies in low light, and the like. In addition, the device can include one or more cameras, each of which can be selected for obtaining different views, have different lens, shutter speeds, resolution, and so forth. While a 360 degree field of view for the one or more cameras is anticipated, it will be appreciated that a smaller field of view may be provided and will still be within the scope of the present disclosure. The camera or cameras can be mounted on the device in place of or in addition to the motion sensor, can be mounted on the device next to the sensor, or can be mounted on the device in a location away from the location of the sensor if desired, such as on the side or sides of the device. It will be understood that in some embodiments, the camera or cameras can be connected to the circuitry of the controller 3 so that the camera or cameras can be configured and controlled by a user as described herein, including by a user who is located remotely from the device.

It will be appreciated that a variety of lens or filters can be used with respect to the camera or cameras involved and the resulting images and/or video obtained. In applications for hunting, it will be appreciated that it is unlikely that a flash or other lighting would be desired in connection with the activation and use of the camera or cameras. However, in situations not involving hunting, or in which the potential disruption of wildlife activity due to lighting is not a concern (such as may be the case for a safari or the use of the device for photographic applications for wildlife or nature photos or video), a flash and/or other lights or lighting equipment may be provided. In such applications, the flash or lighting may be built into the device or incorporated on its exterior, or may be removably attachable to the device. In such embodiments, the device can be configured to check to see if a flash or other lighting equipment is connected to the device and, if so, to automatically activate the flash or other lighting equipment at the same time the camera or cameras are activated. Alternatively, the device can be programmed to allow a user to selectively activate the flash or lighting equipment or to enable the flash or lighting equipment for automatic operation in synchronization with the operation of the camera or cameras.

The device and/or the camera can include non-volatile memory and appropriate hardware and software to store the photographs or video images. The camera can be removable from the device or can be permanently attached to the device and, in either event, the device can include appropriate hardware and software to allow a user to download the photographs or video from the device. For example, the device can include an USB port or other standard port to which a user can attach a computer and transfer the images from the camera or other memory of the device. As another example, the device could include a smart card port into which a flash memory card is inserted by a user, with the device automatically storing photos and video on the memory card so that the user can simply remove the card when convenient without opening the device. Alternatively, the device can be programmed to transmit the photographs and video wirelessly, such as by cellular, WiFi, or BLUETOOTH communications with a receiving device, such as a cell phone, computer, tablet, watch, or other device. In yet another embodiment, the device can transmit images from the camera to a remote location together with the signal indicating that an animal has been detected, and the image can be displayed and/or stored on the user's smartphone.

In still another embodiment (not shown), the device can include appropriate hardware and software to transmit and receive global positioning system (GPS) signals. Such as feature may be useful in order to help track or map animal movements. For example, a plurality of the devices with GPS locators may be set in a variety of locations throughout a ranch, farm, park, or the like. Each device can then store in memory the times, sizes of animals, images of animals, and the like detected and recorded during operation over a given time period, such as overnight. Because each device has a GPS locator, the information gathered by each device can be aggregated and mapped to one or more maps of the ranch, farm, park or the like, and such a map can be animated, which can reveal certain animal movements over the time of operation. The time of operation and information so mapped can include data gathered over hours, days, weeks, months or the like as may be desired, thereby allowing a user to obtain useful information about the location, movement, and habits of various animals.

It should be appreciated that each of the MDMs and/or the hub can be provided with non-volatile memory to store various types of information to be transmitted or retrieved by the user. For example, an MDM can store information regarding the dates and times when movement is detected, photographs or video taken when movement is detected, and the size(s) of the animal(s) detected in each situation. Moreover, such information can be associated with the GPS coordinates of the MDM when such movement is detected. In addition, such information can be transmitted wirelessly to an associated hub, to another one or MDMs, and/or to a user device, either in real time (e.g., when movement is detected by an MDM or very shortly after such movement is detected) or at a later time.

In yet another embodiment of the systems and methods of the present disclosure, a user's communication device can be provided with software to help communicate and use the information provided by the MDMs and the hub. As noted above, the user's communication device can be any one (or more) of a number of devices, such as a smartphone, a tablet, a computer, a smartwatch or other wearable device, a scope (such as can be attached to a gun), or another device which can be attached to a scope or a gun, or to various types of night vision equipment. For example, in some embodiments, a user may have a smartphone or a tablet computer or the like, and may download and install a software application on the phone or tablet. The application in this embodiment is operable to receive and act on signals received wirelessly from a hub (or alternatively, directly from one or more MDMs if the hub is inoperable or otherwise not in communication with the user's device. In one embodiment, the application has a setup function for allowing a user to input data on the number and locations of MDMs. For example, a user can begin running the application and go to an input or setup screen, indicate the number of MDMs to be used, and then, as the user deploys the MDMs in locations deemed useful or convenient, the user can have application note and store the GPS locations corresponding to each of the MDMs on the user's device. The application can also have an operational mode, and can include a screen listing the various MDMs in use (such as by 1, 2, 3, 4, or the like). The application can show each of these as green, for example, if each MDM is online and in communication with the hub, but show an MDM in red if, for example, that MDM fails to respond to a heartbeat signal from the hub within the specified time period. Such indicators provide quick visual confirmation to the user that an MDM is operational or is not, as may be the case. In addition, the application may provide an operational screen which shows the locations of the MDMs (or just one or some of them) on a map, such as a stylized map, a topographical map, or a photographic aerial image of the relevant area. The application can indicate visually on the display of the user's device when movement is detected by one or more of the MDMs, thus allowing the user to see the relative locations of the animal(s) and the user himself or herself. In addition, the application can provide displays prompting the user to determine and indicate whether he/she wants to receive alerts with vibrations of the device, by sound, and/or visually, and the application can provide displays prompting the user to search for MDMs and/or the hub, to disconnect from the MDMs and/or hub, to discontinue some or all notifications previously selected and enabled, and to set filters for the size(s) of the animals of interest, such as for any size, only larger sizes, and so forth. Those skilled in the art will appreciate that various displays and prompts may be used for setup and for inputting of information, as well as for displaying information (including the detection of movement by an MDM) to the user.

The devices disclosed herein can be configured to operate in the dark at night, or during the daylight hours relieving the hunter of the need to remain concentrated on the feeder for the entire hunting period. For operation in dark conditions, it should be noted that the user's communication device can be any one (or more) of a variety of types of night vision equipment, such as a scope, binoculars, goggles, a monocular, or the like, which is adapted as described above with respect to the user's communication device(s) generally, or can include a communication device that can be removably attached to night vision equipment, or a scope, a gun, or the like.

Although the embodiments have been described in terms of specific situations such as night hunting, it is understood that use of the devices, systems and methods described herein are not limited to the preferred embodiments described herein. Those skilled in the art will appreciate that the devices, systems and methods described herein can be used in a variety of situations and applications, including for wildlife location, tracking, and photography, whether or not the wildlife in question is being hunted.

All of the apparatus, components and methods disclosed and claimed herein can be made and used without undue experimentation in light of the present disclosure. While the apparatus, components and methods of this invention have been described in terms of preferred embodiments, it will be apparent to those of skill in the art that variations may be applied to the construction or components described herein without departing from the concept, spirit and scope of the invention. All such similar substitutes and modifications apparent to those skilled in the art are deemed to be within the spirit, scope and concept of the invention as defined by the appended claims.

The invention claimed is:
1. A system for stealth hunting, the system comprising:
a motion detector module comprising:
a housing having a recess area;
an electronic circuit contained in the housing;
a power source or a connector for a power source connected to the electronic circuit;
a motion sensor having a detection zone and operable to detect an animal in the detection zone, the sensor being connected to the electronic circuit and at least partially contained in the housing;
a notification device connected to the electronic circuit, the notification device being operable to, in response to a first signal from the sensor, activate a light emitting diode (LED), wherein the LED is located in the recess area of the housing, wherein the LED is configured to be visible at a location at least 50 yards from the LED, and wherein the recess area shields light from the LED to exclude the detection zone from illumination by the LED; and
a wireless communication device connected to the electronic circuit, the wireless communication device enabled for electronic activation in response to a second signal from the motion sensor.

2. The system of claim 1, wherein the motion sensor is operable in darkness.

3. The device of claim 1, wherein the motion sensor comprises at least one of: a night time motion sensor, a passive infrared heat sensor, an ultrasonic sensor, a microwave sensor, an acoustic wave sensor, and a vibration sensor.

4. The system of claim 1, wherein the motion sensor is effective to sense motion within a 360° perimeter.

5. The system of claim 1, wherein the motion sensor is configurable to transmit the first signal in response to detecting the motion of an animal within a selected range of body profile area.

6. The system of claim 5, wherein the motion sensor is configurable to transmit the first signal in response to detecting the motion of animals having at least 3 square feet in body profile area.

7. The system of claim 1, wherein the LED emits a pulse of light having a duration from 1 to 20 seconds when activated.

8. The system of claim 1, wherein the LED emits red light visible for at least 500 yards when activated.

9. The system of claim 1, wherein the power source comprises a battery.

10. The system of claim 1, wherein the wireless communication device comprises a radio frequency (RF) transmitter adapted to transmit a wireless signal to a night vision device.

11. The system of claim 10, wherein the RF transmitter transmits at a frequency of 900 MHz.

12. The system of claim 1, wherein the housing comprises a magnet effective to attach the housing to a metal surface.

13. The system of claim 1, wherein the wireless communication device comprises a cellular transmitter.

14. The system of claim 1, further comprising a hub device, the hub device further comprising:

a second wireless communication device configured to receive wireless communications from a plurality of motion detector modules, including the motion detector module;

a plurality of indicator lights respectively corresponding to at least one of the plurality of motion detector modules;

a vibrator device;

a short range wireless transmitter; and a second electronic circuit configured to respond to the motion detector modules by activating at least one of the vibrator device and the indicator lights, and by transmitting over the short range wireless transmitter.

15. The system of claim 14, wherein each of the motion detector modules is assigned an identifier and wherein the identifier is transmitted by the wireless communication device.

16. The system of claim 14, wherein the short range transmitter has a range of at least 100 yards.

17. The system of claim 16, wherein the short range wireless transmitter is pairable to a portable electronic device.

18. The system of claim 17, wherein the portable electronic device is one of: a cellular phone, a smart phone, a tablet, a pad, a pager, a laptop, and a watch.

19. The system of claim 17, wherein the portable electronic device is a wearable electronic device.

20. The system of claim 14, wherein the second electronic circuit is configured to generate an error message when the same identifier is received from two or more motion sensor modules.

21. The system of claim 14, further comprising a scope-mountable flashlight.

22. A system for stealth hunting, the system comprising:
(a) a plurality of motion detector modules, each motion detector module further comprising:
 (i) motion sensor;
 (ii) a wireless communication device electronically activatable by the motion sensor;
 (iii) an indicator light source electronically activatable by the motion sensor, wherein the indicator light is visible from a distance of at least 100 yards, and wherein the indicator light is located in a recess area of the motion detector module and the recess area shields the indicator light to exclude a ground area around the motion detector module from illumination by the indicator light;
 (iv) an electronic circuit configured to control the motion sensor, and to control the interaction of the light source and the wireless communication device with the motion sensor; and
(b) a hub device, the hub device further comprising:
 (i) a second wireless communication device configured to receive wireless communications from a plurality of motion detector modules, including the motion detector module;
 (ii) a plurality of indicator lights, each of the indicator lights corresponding to at least one of the plurality of motion detector modules;
 (iii) a vibrator device;
 (iv) a short range wireless transmitter; and
 (v) a second electronic circuit configured to respond to the motion detector modules by activating at least one of the vibrator device and the indicator lights, and by transmitting over the short range wireless transmitter.

23. The system of claim 22, wherein the wireless communication device comprises a radio frequency (RF) transmitter.

24. The system of claim 23, wherein the RF transmitter transmits at a frequency of 900 MHz.

25. The system of claim 22, wherein the short range transmitter has a range of up to about 100 yards.

26. The system of claim 25, wherein the short range wireless transmitter is pairable to a portable electronic device.

27. The system of claim 26, wherein the portable electronic device is one of: a cellular phone, a smart phone, a tablet, a pad, a pager, a laptop, and a watch.

28. The system of claim 26, wherein the portable electronic device is a wearable electronic device.

29. The system of claim 22, further comprising the plurality of motion detector modules,
wherein each of the motion detector modules transmits an identifier code that is indicative of the motion detector module;
wherein the hub device receives the identifier code; and
wherein the second electronic circuit is configured to identify a first motion detector module associated with the identifier code and to activate a first indicator light respectively corresponding to the first motion detector module.

30. The system of claim 22, further comprising a scope-mountable flashlight.

31. A device for providing an alert of the presence of one or more animals comprising:
a housing having a recess area;
a sensor located at least partially within said housing and operable over an arc of at least 300 degrees to detect the presence of one or more animals and connected to one or more processors executing software, wherein said sensor is configured to transmit a signal in response to the detection of one or more animals;
a notification device located at least partially within the recess area of said housing and connected to at least one of said one or more processors and operable to receive a signal therefrom in response to a signal from said sensor, wherein the recess area shields light from said notification device so said notification device does not illuminate a ground area underneath a detection zone of said sensor and wherein said notification device is operable to wirelessly transmit a signal to at least one user communication device at a location remote from said sensor and said notification device.

32. The device according to claim 31 wherein said at least one user communication device comprises at least one of a smartphone, a computer, a smart watch, a tablet, night vision goggles, a night vision scope, a night vision monocular or binoculars, or a scope.

33. The device according to claim 31 further comprising at least one camera located at least partially within said housing and operable to take still or moving images over an arc of at least 300 degrees.

34. The device according to claim 33 wherein said camera is operable to take still or moving images over an arc of 360 degrees.

35. The device according to claim 34 wherein said camera is operable to take still or moving images in response to a signal indicating that said sensor has detected the presence of one or more animals.

36. The device according to claim 35 further comprising non-volatile memory connected to said camera and operable to store still or moving images taken by said camera.

* * * * *